(12) United States Patent
Sasaki

(10) Patent No.: US 8,521,354 B2
(45) Date of Patent: Aug. 27, 2013

(54) DIAGNOSIS OF SENSOR FAILURE IN AIRFLOW-BASED ENGINE CONTROL SYSTEM

(75) Inventor: Shizuo Sasaki, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 1114 days.

(21) Appl. No.: 12/190,354

(22) Filed: Aug. 12, 2008

(65) Prior Publication Data

US 2010/0042284 A1   Feb. 18, 2010

(51) Int. Cl.
*G06F 7/00* (2006.01)

(52) U.S. Cl.
USPC .................................................. 701/29.1

(58) Field of Classification Search
USPC ............... 701/29, 35, 102, 29.1, 29.7, 30.5; 60/601–603; 123/435, 304
See application file for complete search history.

(56) References Cited

U.S. PATENT DOCUMENTS

| | | | | |
|---|---|---|---|---|
| 6,370,935 B1* | 4/2002 | He et al. | | 73/1.34 |
| 6,802,302 B1* | 10/2004 | Li et al. | | 123/568.16 |
| 7,163,007 B2 | 1/2007 | Sasaki et al. | | 123/673 |
| 7,389,173 B1 | 6/2008 | Wang | | 701/103 |
| 7,706,958 B2* | 4/2010 | Itoga et al. | | 701/108 |
| 2003/0127079 A1* | 7/2003 | Onodera et al. | | 123/568.21 |
| 2003/0226398 A1* | 12/2003 | Hernandez et al. | | 73/118.1 |
| 2005/0139193 A1* | 6/2005 | Kobayashi et al. | | 123/350 |
| 2005/0229903 A1* | 10/2005 | Kobayashi et al. | | 123/435 |
| 2007/0062499 A1* | 3/2007 | Miyasako et al. | | 123/568.16 |
| 2007/0074707 A1* | 4/2007 | Ogawa et al. | | 123/568.14 |
| 2007/0144502 A1* | 6/2007 | Ogawa et al. | | 123/568.14 |
| 2008/0243361 A1 | 10/2008 | Wang | | 701/103 |
| 2009/0007888 A1* | 1/2009 | Sarlashkar et al. | | 123/478 |
| 2009/0132153 A1* | 5/2009 | Shutty et al. | | 701/108 |
| 2011/0088674 A1* | 4/2011 | Shutty et al. | | 123/568.21 |

OTHER PUBLICATIONS

U.S. Appl. No. 11/773,784, "Combustion Control System Based on In-Cylinder Conditions", Sarlashkar et al., 27 pages, filed Jul. 5, 2007.
U.S. Appl. No. 12/134,598, "Combustion System for Internal Combustion Engine with Rich and Lean Operating Conditions", Sasaki et al., 56 pages, filed Jun. 6, 2008.

* cited by examiner

*Primary Examiner* — Kim T Nguyen
(74) *Attorney, Agent, or Firm* — Chowdhury & Georgakis, P.C.; Ann C. Livingston

(57) ABSTRACT

An air-flow based control system for an internal combustion engine has various sensors that are used to calculate various control commands. By comparing pairs of values calculated from different sensors, errors in connection with the sensors can be detected.

4 Claims, 4 Drawing Sheets

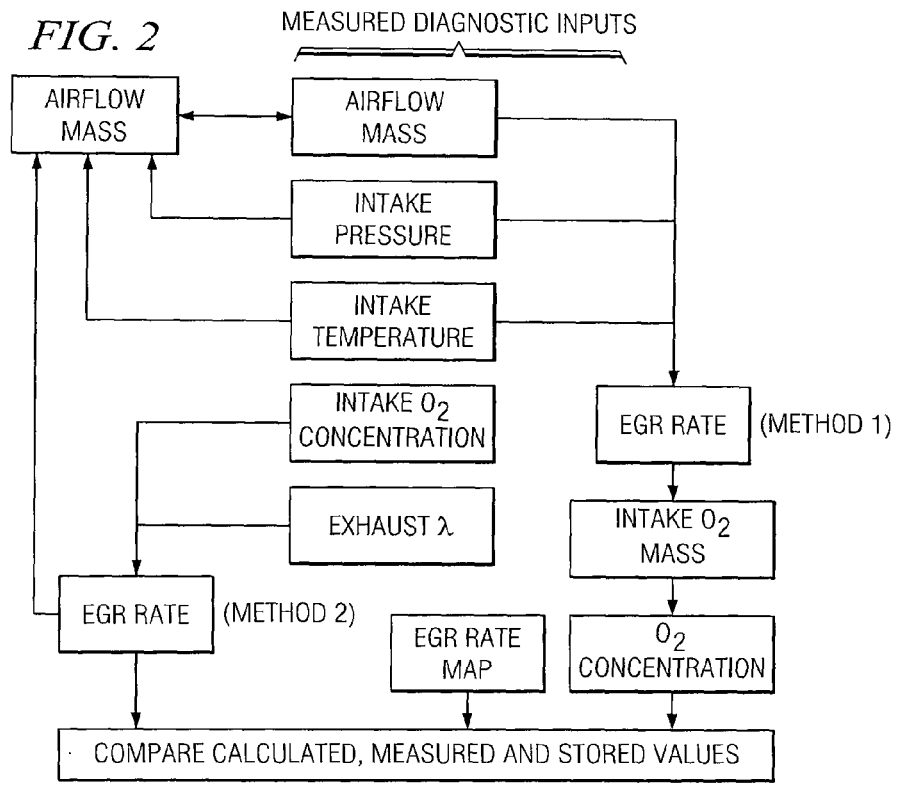
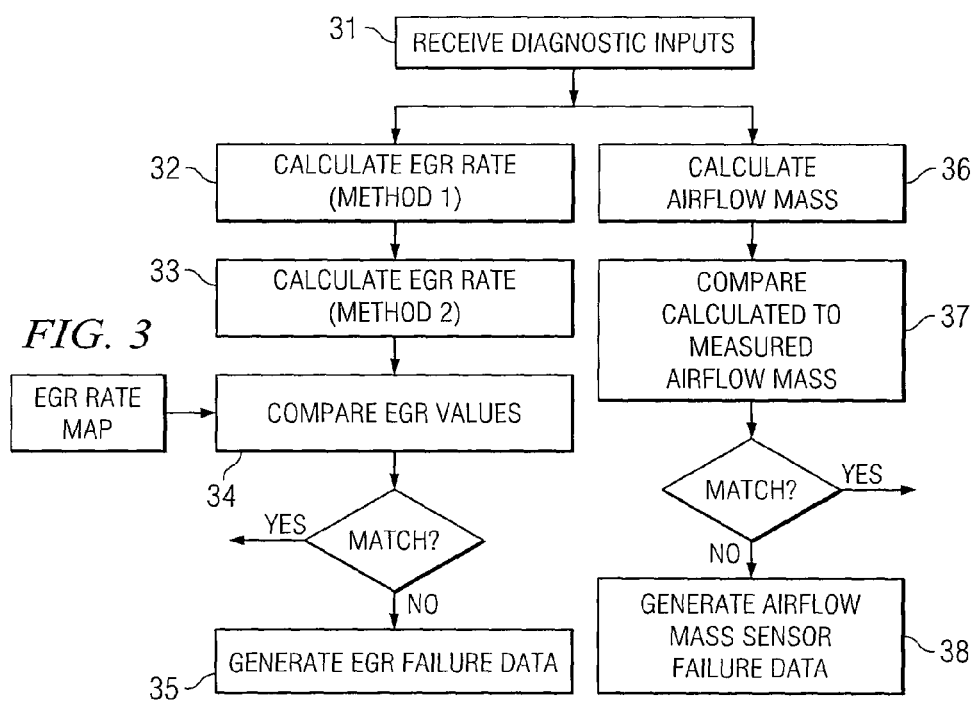

DIAGNOSIS OF SENSOR FAILURE IN AIRFLOW-BASED ENGINE CONTROL SYSTEM

TECHNICAL FIELD OF THE INVENTION

This invention relates to control systems for internal combustion engines, and more particularly to diagnosing sensor failures in an airflow-based engine control system.

BACKGROUND OF THE INVENTION

As a result of the Clean Air Act Amendments of 1990, two "tiers" of emission standards for light-duty vehicles in the United States were defined. These standards specifically restrict emissions of carbon monoxide (CO), oxides of nitrogen (NOx), particulate matter (PM), formaldehyde (HCHO), and non-methane organic gases (NMOG) or non-methane hydrocarbons (NMHC). The Tier I standard was phased in from 1994 to 1997. Tier II standards are being phased in from 2004 to 2009. Within the Tier II standard, there are sub-rankings ranging from BIN 1-10.

To meet these standards, many advances have been made in engines and their control systems. New combustion control strategies are designed to minimize engine-out emissions and to control exhaust gas composition and temperature for optimum operation of post-combustion emissions control devices.

One such combustion control strategy is based on "airflow-based" control, especially designed for diesel engines or other engines that use direct fuel injection. "Airflow-based" control systems may be contrasted to more conventional "fuel-based" control systems. In fuel-based control, in response to activity of the accelerator pedal, the engine control unit determines the quantity of fuel to inject. Downward action of the accelerator pedal causes the engine control unit to inject more fuel. With this type of engine control, it is difficult to provide air-fuel ratios that are matched to desired combustion modes.

Airflow-based control systems are also referred to as "airflow dominant" control systems. In modern engines, the dynamics of fuel delivery are fast and can be controlled on a cylinder-by-cylinder basis. On the other hand, airflow is greatly affected by delays in the exhaust gas recirculation (EGR) path and by turbocharger lag. Airflow dynamics are slower and more difficult to control than fuel delivery. To achieve specific air-fuel ratio targets, in airflow dominant control systems, the fast fuel dynamics follow the slower airflow dynamics.

Airflow based control systems require accurate sensors and airflow models. The inputs to the control calculations include both engine operating inputs, such as accelerator pedal position and engine speed, as well as sensor inputs, such as airflow mass, intake temperature, and intake pressure. Accurate control outputs, such as commands to control fuel injection and air-handling devices, require accurate real time input measurements.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 illustrates the input measurements, input calculations, and the calculations performed by the diagnosis unit of FIG. 1.

FIG. 3 further illustrates the diagnostic process performed by the diagnosis unit of FIG. 1, using the inputs of FIG. 2.

DETAILED DESCRIPTION OF THE INVENTION

The following description is directed to diagnosing sensor failures in an airflow-based combustion control system for an internal combustion engine. More specifically, methods are described for diagnosing failure of various measurement devices whose measurements are used for calculating airflow mass and the EGR rate.

U.S. Pat. No. 7,163,007, entitled "Control System for Internal Combustion Engine", to Sasaki, et al, assigned to Honda Motor Co., describes one example of an "airflow based" combustion control system. The engine uses dilute combustion with the goal of low engine-out emissions to minimize the required exhaust treatment. For both lean and rich operating conditions, an estimated in-cylinder oxygen amount (oxygen mass) is used to determine fueling parameters. U.S. Pat. No. 7,389,173, entitled "Control System for an Internal Combustion Engine Operating with Multiple Combustion Modes", to Wang, assigned to Southwest Research Institute, and U.S. patent Ser. Nos. 11/773,784, 12/061,711, and 12/134,598 also describe various airflow-based control systems and methods.

The systems and methods of each of the above-referenced patents and patent applications use various calculations in which fresh airflow mass is an important control system input. Thus, each of these patents and patent applications describe engines and control systems with which the methods described herein may be used. Each is incorporated herein by reference.

As indicated in the Background, in an airflow-based control system, various engine control parameters are calculated on the basis of the fresh airflow mass and the recirculated exhaust (EGR) flow rate. Thus, it is important to have accurate measurement of both flow rates.

Figure 1:
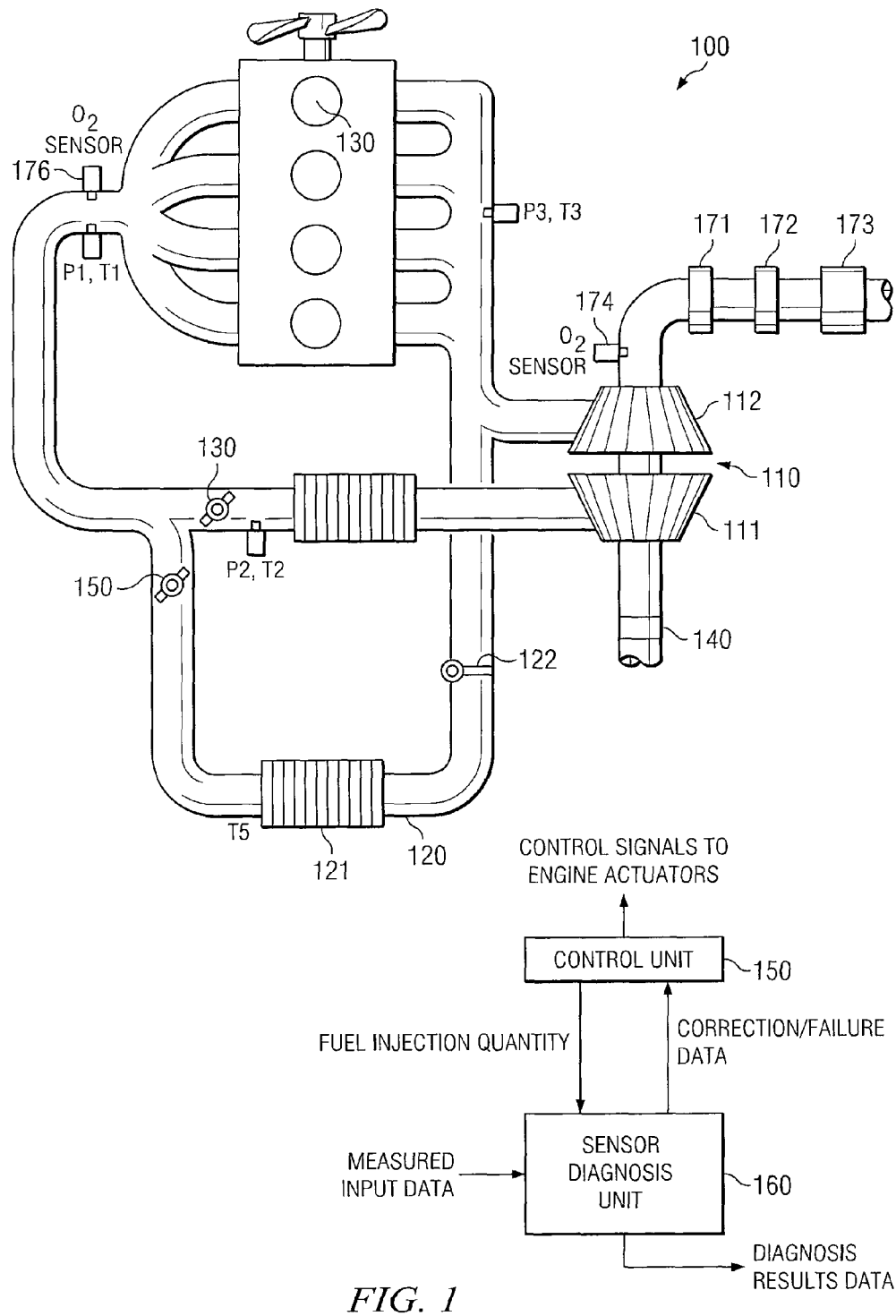
FIG. 1 illustrates an example of an internal combustion engine having fuel injection and exhaust gas recirculation (EGR), and a diagnostic unit that operates in accordance with the methods described herein.
Figure 4:
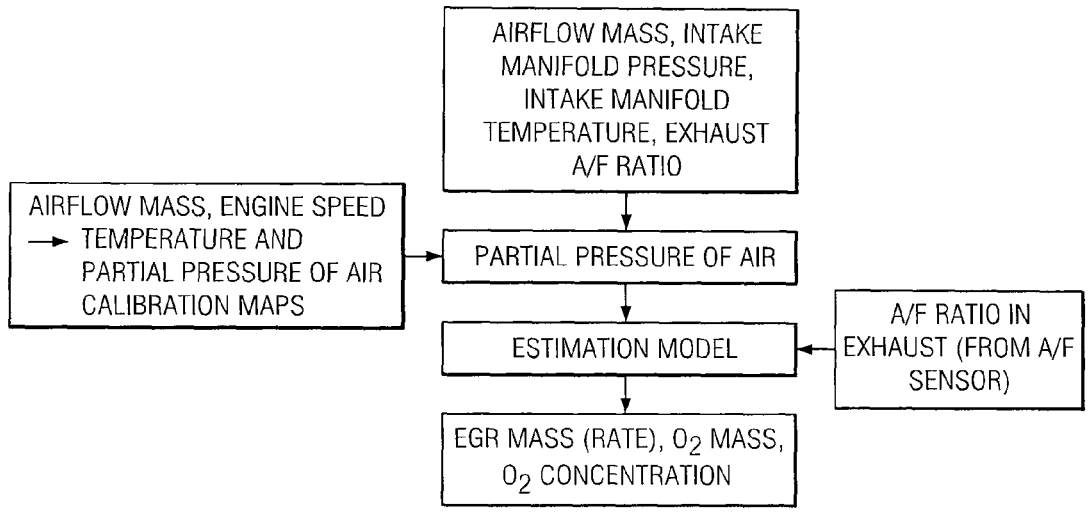
FIG. 4 illustrates the calculation of the EGR rate (Method 1).

FIG. 1 illustrates an internal combustion engine with fuel injection, of a type with which the methods described herein may be used. In the example of FIG. 1, engine 100 is a diesel engine. However, the methods described herein are not limited to diesel engines; a stratified charge engine is one example of a gasoline engine that also uses fuel injection.

Various elements of engine 100 are known. Although not explicitly shown, each cylinder 130 has a fuel injector. The fuel injection quantity is determined by the engine control system, which calculates ever-varying fuel injection quantity values and delivers a corresponding control signal to the fuel injectors.

Turbocharger 110 has a compressor 111 and turbine 112. An example of a suitable turbocharger is a variable geometry turbocharger (VGT).

Engine 100 also has an EGR (exhaust gas recirculation loop), which in the example of FIG. 1, is a high pressure loop.

EGR cooler 121 cools the exhaust before it is mixed with fresh air from the compressor 111.

Valves 130 and 150 control boosted air intake into the cylinders and the EGR flow, respectively.

FIG. 1 further illustrates the location of various temperature and pressure measurement sensors, for sensing T1, T2, and T3 (temperatures) and P1, P2, and P3 (pressures). Of particular interest herein are the intake temperature and intake pressure, as measured by sensors P1 and T1.

An O2 sensor 174 is installed to measure the O2 in the exhaust from the exhaust manifold. A mass airflow sensor 140 measures the flow rate of fresh air intake. Various mass airflow sensors are known and commercially available, with measuring airflow directly and others estimating airflow from intake pressure and other parameters.

A combustion control unit 150, programmed to control various combustion control parameters in accordance with the methods described herein. Control unit 150 may be a processor-based unit having appropriate processing and memory devices. The memory of control unit 150 also stores various tables, which store maps of known values to variables. Values for these tables are acquired as described below, and then stored in control unit 150 for access during engine operation. Control unit 150 may be integrated with or part of a comprehensive engine control unit.

Control unit 150 is programmed to execute various airflow-based control algorithms. As explained in the Background, this means that engine control parameters, such as fuel quantity, EGR rates, etc., are calculated in response to in-cylinder conditions, including the amount of fresh air available to the cylinders during any given engine operating condition. For such a system, it is imperative that these calculations be accurate.

An example of an airflow based control system is described in U.S. Pat. No. 7,389,173, referenced above and incorporated by reference herein. The control system uses an engine model, in which an important control calculation is an "intake manifold fresh air fraction", which is the ratio of fresh air from the compressor to the amount of recirculated exhaust gas.

Another example of an airflow based control system is described in U.S. patent Ser. No. 12/134,598 referenced above and incorporated by reference herein. In this control system, an important control calculation is the amount of in-cylinder oxygen mass, which is calculated from the fresh airflow rate. Other examples and features of airflow-based control systems are described in U.S. Pat. No. 7,389,173 and U.S. patent application Ser. Nos. 11/773,784 and 12/061,711, also referenced above and incorporated by reference herein.

Of particular interest to this description, system 100 further has a sensor diagnostic unit 160. Its operation is explained below, and like control unit 150, it may be implemented with digital processing devices and memory programmed in accordance with the methods described herein. For use in its calculations, it receives certain calculations as well as certain sensor outputs, as described below.

FIG. 2 illustrates inputs and outputs of the diagnostic process performed by diagnosis unit 160. It is used to diagnose faults in connection with any, some or all of the following sensors and calculations: airflow mass sensor 140, intake pressure sensor P1, intake manifold O2 sensor 176, and EGR fouling. The specific diagnostic methods are explained below in connection with FIGS. 3 and 8. As explained below in connection with FIG. 9, the diagnosis unit 160 may be enhanced to also perform fuel injection quantity correction.

As explained below, diagnostic unit 160 operates by comparing pairs of values, with each pair being for the same parameter but derived from different calculations or measurements. For example, for airflow mass, there is a measured value from sensor 140 and a calculated value based on sensors other than airflow sensor 140. Each pair of values is compared. If the two values match (within a specified tolerance), the sensors used to derive the values are consistent, and no fault exists. If the values of a pair do not match, there is a fault. The faulty sensor can then be identified by more detailed analysis.

The method of FIG. 2 is implemented by the diagnosis unit 160 of FIG. 1, appropriately programmed. It receives various inputs, either calculated or measured. Specifically, it receives an airflow mass value from an airflow sensor, such as mass airflow sensor 140.

Diagnosis unit 160 also receives intake pressure and intake temperature values from the corresponding pressure and temperature sensors (P1 and T1) illustrated at the intake manifold in FIG. 1. It also receives an exhaust O2 concentration value from sensor 174.

As further explained below in connection with FIG. 3, a first set of the diagnostic input values are used to calculate an airflow mass value. A second set of these input values is used to calculate a first EGR rate value. A third set of these input values is used to calculate a second EGR rate value.

It is assumed that the diagnostic input values represent engine conditions during the engine operating events, and in particular during the same fuel injection event. The calculations and estimations described herein are "real time" in the sense that they are based on simultaneous real time measurements and calculations and provide real time failure diagnosis.

FIG. 3 illustrates further details of the diagnostic method. The method of FIG. 3 has two paths, one for diagnosing failure in connection with EGR rate calculation inputs (Steps 32-35), and another path for diagnosing failure in connection with airflow mass sensor 140 (Steps 36-38).

Step 31 is receiving diagnostic inputs illustrated in FIG. 2. As illustrated by the arrows in FIG. 2, certain inputs are used for certain calculations.

Referring again to FIG. 3, Step 32 is performing a first EGR rate calculation (Method 1). This method of calculating the EGR rate is based on airflow mass, the intake pressure, and the intake temperature, which are measured diagnostic inputs. This method uses the ideal gas law applied to the intake manifold, which provides a relationship between the EGR rate, the fresh airflow mass rate as measured by sensor 140, and the total (EGR gas plus fresh air) gas flow rate into the cylinders. The total gas flow rate can be calculated from known speed density methods. Specifically, at a given engine speed, the intake manifold pressure is almost proportional to the total mass of in-cylinder gas. Thus, the total in-cylinder gas mass is predictable from intake manifold pressure, if account is taken of the effect of temperature at each engine speed. This prediction assumes that temperature affects volumetric efficiency at a given engine speed.

Further details of calculating the total in-cylinder gas mass are described in U.S. Pat. No. 7,389,173, referenced above. An example of calculating the EGR rate from airflow mass, intake pressure and intake temperature is described in U.S. Pat. No. 7,163,007, referenced above. FIGS. 4-7 and the accompanying text provide further explanation of EGR rate calculations (Method 1).

Step 33 is performing a second EGR rate calculation (Method 2). This method of calculating the EGR rate is based on the relationship between the intake manifold O2 concentration (as measured by sensor 176) and the exhaust O2 concentration (as measured by sensor 174). For example:

EGR rate=$(0.211-O2_{intake})/(0.211-O2_{exhaust})$

Step 34 is comparing the two calculated EGR rate values. If the values match (within a specified tolerance) there is no error in connection with the EGR rate diagnostic inputs. If they do not match, in Step 35, appropriate failure data is generated so that further diagnostic analysis can be performed in connection with EGR rate calculation inputs. More specifically, a mismatch of the calculated values may indicate failure in connection with the intake pressure sensor P1.

As illustrated, comparison may also be made to an EGR rate value provided from an EGR rate base map. Such maps are often stored and used by an engine control unit to determine EGR rates based on current engine operating inputs. Thus, Step 34 may include comparing either or both of the calculated EGR rates to the rate provided by the EGR base map (referred to herein as the "mapped EGR rate"). If the EGR rate values match, no failure is indicated. If they do not match, EGR failure, such as EGR fouling, is indicated, and appropriate data is generated. It is assumed that the all comparisons are made under the same engine operating conditions, particularly at the same engine speed and O2 mass values.

The EGR rate comparisons are between pairs of values, and depending on which values match or do not match, different failures may be indicated. If the two calculated EGR rates match and the mapped value does not, EGR rate failure is indicated. If the EGR rate (Method 1) and the mapped EGR rate match but the EGR rate (Method 2) does not, sensor failure in connection with the EGR rate (Method 2) calculations is indicated. If the EGR rate (Method 2) and the mapped EGR rate match but the EGR rate (Method 1) does not, sensor failure in connection with the EGR rate (Method 1) calculations is indicated. Further analysis is used to indicate which sensor of the diagnostic inputs may be defective.

Step 36 is calculating an airflow mass value. This value is calculated on the basis of the EGR rate (Method 2, calculated as described above), the intake pressure, and the intake temperature. As stated above, the total gas flow rate into the cylinders can be calculated from temperature and pressure measurements. This value minus the EGR rate provides a calculated airflow rate value.

Step 37 is comparing the measured airflow mass value to the airflow mass value calculated in Step 36. If the values match (within a specified tolerance) there is no error in connection with the airflow mass diagnostic inputs. If they do not match, in Step 38, appropriate failure data is generated so that further diagnostic analysis can be performed in connection with the airflow mass sensor 140 or the airflow mass calculation inputs.

FIGS. 4-7 illustrate the calculation of the EGR rate (Method 1). As stated above, the input values are airflow mass, intake manifold pressure, intake manifold temperature, and the exhaust air/fuel ratio. The total intake O2 mass is the sum of the air contributed by the fresh air intake (as measured by sensor 140) and the fresh air contributed by EGR. The total intake manifold pressure (Pin, as measured by sensor P1) is the sum of the partial pressure contributed by fresh air (Pa) and the partial pressure contributed by EGR (Pe). The calculation of the EGR rate is based on the measured pressure, airflow, and temperature values. If the EGR rate is known, the total in-cylinder O2 mass can be calculated.

Furthermore, if the total in-cylinder O2 mass is known, the intake manifold O2 concentration can be calculated. The exhaust A/F ratio can be obtained in various ways, such as by comparing the O2 measured by sensor 176 to the O2 measured by sensor 174 during rich engine operation. The exhaust A/F ratio can also be estimated during no EGR and high load engine operation from the airflow mass measurement from sensor 140 and the fuel injection amount as commanded by the engine control unit.

Figure 5:
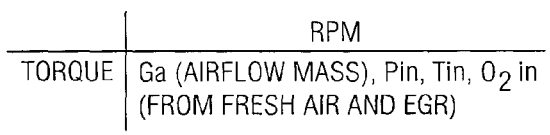
FIGS. 5-7 illustrate calibration maps used for the calculations of FIG. 4.
Figure 6:
Figure 7:

FIGS. 5, 6, and 7 illustrate how temperature and partial pressure (Pa) are calibrated over engine speed (rpm) and fresh air mass. In the calibration map of FIG. 5, airflow mass (Ga), intake manifold pressure (Pin), intake manifold temperature (Tin), and O2 intake (O2in) are calibrated over engine torque and engine speed (rpm). In the calibration maps of FIGS. 6 and 7, partial pressure from fresh air (Pa) and intake manifold temperature (Tin) are calibrated over airflow mass (Ga) and engine speed (rpm).

Details of a suitable method for estimating in-cylinder O2 (intake O2) are described in U.S. Pat. No. 7,163,007, referenced above.

Referring again to FIG. 3, it should be understood that diagnosis unit 160 could be programmed to perform either or both of these diagnostic paths. In other words, diagnosis unit 160 could be programmed to detect failure in connection with EGR rate calculations, airflow mass calculations, or both. The particular diagnostic inputs needed for each EGR rate and airflow mass calculations are described below. If only airflow mass sensor failure is being diagnosed (Steps 36-38), either of the EGR rate calculations (Step 32 or Step 35), or some other EGR rate input, could be used.

Figure 8:
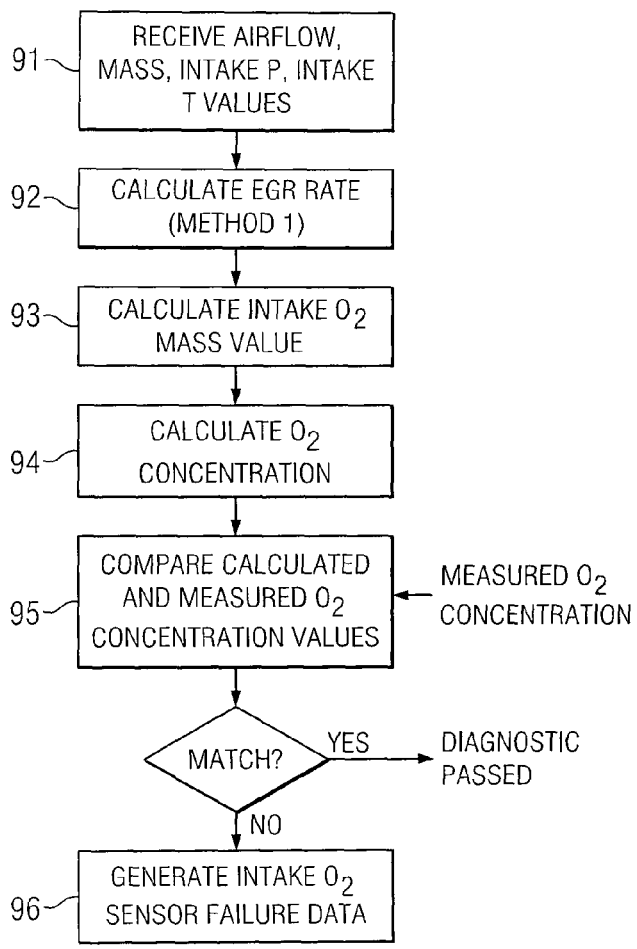
FIG. 8 illustrates how the diagnostic unit is used to diagnose failures in connection with the intake manifold O2 sensor.

As stated above and as illustrated in FIG. 8, the measured and calculated inputs of FIG. 2 may also be used to diagnose failure in connection with intake manifold O2 sensor 176. This method involves the calculations described above in connection with FIG. 4.

Step 91 is receiving values for airflow mass (measured by sensor 140), and for intake temperature and pressure (measured by sensors T1 and P1). Step 92 is calculating the EGR rate using Method 1 explained above in connection with FIG. 3, Step 32. Step 93 is calculating an intake O2 mass value, which is calculated without use of the intake manifold O2 sensor and based on the calculated EGR rate. Step 94 is calculating the intake manifold O2 concentration, based on the results of the above steps. Step 95 is comparing the measured and calculated intake manifold O2 concentration values. If there is a match, no sensor failure is indicated. However, if the values do not match, a failure in connection with sensor 176 is indicated, and appropriate data is generated in Step 95.

Figure 9:
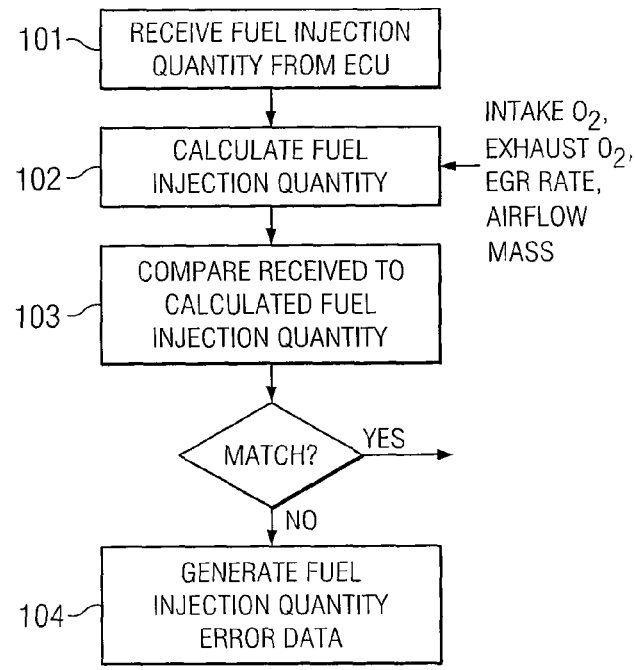
FIG. 9 illustrates how the diagnostic unit is used to diagnose failures in connection with the commanded fuel injection quantity.

FIG. 9 illustrates how the diagnostic unit illustrated in FIGS. 1 and 2 may be enhanced to diagnose fuel injection quantity errors. Step 101 is receiving a current fuel injection quantity (mass) valve from the control unit 150.

Step 101 may be performed using these input values: intake manifold O2 concentration (from sensor 176), exhaust O2 concentration (from sensor 174), EGR rate (calculated as described in Method 1 or Method 2 of FIG. 3), and airflow mass (from sensor 140). Using these input values:

Fuel inj mass=$(O2_{intake}-O2_{exhaust})/(28.96*1-EGR\ rate)*(12+(H/C)/1+(H/C)/4)*$airflow mass, where H/C is the hydrogen-carbon ratio of the fuel. In Step 103, the two fuel injection quantity values are compared. If the two values match, no error or fault is indicated. If they do not match, a fuel quantity injection error is indicated, and in Step 104, appropriate data is generated.

What is claimed is:

1. A method of diagnosing failure in connection with a mass airflow sensor used in an airflow-based engine control system for an internal combustion engine, the engine having one or more cylinders and an exhaust gas recirculation (EGR) system that recirculates exhaust at a variable EGR rate, comprising:

obtaining a measured airflow mass value from the mass airflow sensor;
obtaining a measured intake oxygen concentration value;
obtaining a measured exhaust oxygen concentration value;
calculating an EGR rate based on the relationship between the intake oxygen concentration value and the exhaust oxygen concentration value;
obtaining a measured intake manifold pressure value;
obtaining a measured intake manifold temperature value;
calculating a total gas flow rate into the cylinders, based on the measured intake pressure value and the measured intake manifold temperature value;
subtracting the EGR rate from the total gas flow rate, thereby obtaining a calculated value for a mass air flow rate, which is not based on the measured airflow mass value;
comparing the measured airflow mass value to the calculated airflow mass value; and
generating airflow mass sensor failure data if the comparing step does not result in a match.

2. The method of claim 1, further comprising the steps of accessing a mapped EGR rate from a stored EGR map, and of generating airflow mass failure data only if the calculated EGR rate and the mapped EGR rate are matched.

3. The method of claim 1, wherein the measured intake oxygen concentration value is measured by a first oxygen sensor in the air intake line and the measured exhaust oxygen concentration value is measured by a second oxygen sensor in the exhaust line.

4. A method of diagnosing failure in connection with an intake oxygen sensor or exhaust oxygen sensor of an engine having an exhaust gas recirculation (EGR) system that recirculates exhaust at a variable EGR rate, and having a control system that uses an EGR base map to determine the EGR rate, comprising:

calculating a first calculated EGR rate by subtracting a measured intake air flow rate from a total as flow rate into the cylinders;
obtaining a measured intake oxygen concentration value using the intake oxygen sensor;
obtaining a measured exhaust oxygen concentration value using the exhaust oxygen sensor;
calculating a second calculated EGR rate based on the relationship between the intake oxygen concentration value and the exhaust oxygen concentration value;
accessing the EGR base map stored in memory of the control system, the map providing EGR rates for given engine operating conditions, such that for a current operating condition the EGR rate provided by the map is the EGR rate used to control the EGR rate of the engine; and
comparing the first calculated EGR rate and the second calculated EGR rate with the EGR rate provided by the EGR base map for the same engine speed and intake O2 mass value; and
if the first calculated EGR rate and EGR rate provided by the EGR base map match each other but do not match the second calculated EGR rate, generating data indicating failure of the intake oxygen sensor or the exhaust oxygen sensor.

* * * * *